Figure 1:
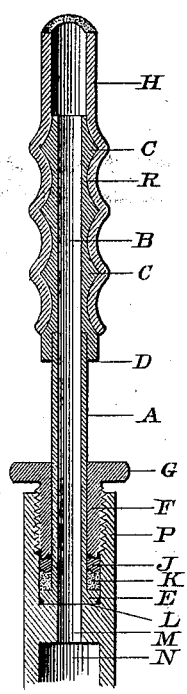

No. 658,045. Patented Sept. 18, 1900.
E. T. SHAW.
HOSE COUPLING.
(Application filed June 25, 1900.)

(No Model.)

WITNESSES,
Charles H. Houghton
Wm. H. Harrington

INVENTOR,
EDWARD T. SHAW.
BY Franklin Scott, ATTORNEY.

UNITED STATES PATENT OFFICE.

EDWARD T. SHAW, OF ARLINGTON, VERMONT.

HOSE-COUPLING.

SPECIFICATION forming part of Letters Patent No. 658,045, dated September 18, 1900.

Application filed June 25, 1900. Serial No. 21,443. (No model.)

*To all whom it may concern:*

Be it known that I, EDWARD T. SHAW, of East Arlington, in the county of Bennington and State of Vermont, have invented certain new and useful Improvements in Hose-Couplings, of which the subjoined description, in connection with the accompanying drawings, constitutes a specification.

My invention is adapted to effect a tight connection between two sections of a hydraulic pneumatic pipe, so that a liquid or fluid, atmospheric or otherwise, may be passed therethrough under pressure without leakage. It is capable of general application under appropriate conditions, but is especially adapted to use with an air-pump in charging pneumatic bicycle-tires. Its principal parts are all attached to the end of a section of rubber hose, which is or may be connected with an air-pump in such a way that no parts are liable to be lost or detached in use or transportation.

The invention resides in the peculiar construction and combination of the several elements and in the improved performance of functions resulting from such construction and combination.

The invention is fully illustrated in the drawings, in which—

Figure 2:
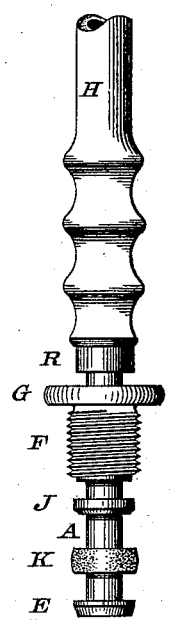

Figure 1 shows a longitudinal axial section through the coupling and the valve-chamber with which it is connected. Fig. 2 is an external view of the male coupling member with a section of ordinary hose attached.

The female member of the coupling, sometimes called the "nipple," is seen at P. This is an appurtenance of the reservoir or receptacle to be charged, which is not shown in the drawings, as it may be the tire of a bicycle or otherwise. In the bottom portion is a chamber N, in which is seated a valve (also not shown) which normally closes under the pressure of the confined fluid. In this nipple is a diaphragm, which is axially bored, the upper surface of which forms a seat on which the lower end of the coupling-pipe rests in use. Above this diaphragm a packing-chamber opens out, the lower part of which is smooth to receive the flanged end E of the coupling-pipe A, the packing-ring K, and the expanding-ring J of the packing devices. The upper or outer part of this chamber is internally screw-threaded to receive the coupling-gland F, the upper part of which is finished to take on a wrench in the ordinary way or may be knurled, as shown, to be turned by the hand. The coupling-pipe is shown made in two sections for convenience in assembling the parts, one of which carries the packing and gland, and the other is fitted to take on the supply-pipe H. The latter portion is in the nature of a bushing R for the supply-tube H and is circumferentially corrugated, as shown, to leave annular ridges C C, over which the tubing H, which ordinarily is of rubber, may tightly contract to prevent the escape of air, gas, or any liquid which may be forced through the pipe. The pipe H is connected at its outer end with a force-pump, atmospheric or otherwise, by means of which the reservoir, pneumatic tire, or other receptacle is charged.

The nipple P and gland F, with the expanding-ring J and packing K, collectively combined, constitute what is known in the mechanic arts as a "stuffing-box;" but the combination shown presents several features different from the ordinary stuffing-box. Ordinarily the packing is compressed between the bottom end of the gland or follower and a seat formed in the bottom part of the nipple-chamber, so that when the gland is screwed down the packing is pressed against the walls of the chamber at bottom and sides and against the lower end of the gland and the piston or tube which passes through the box. In this invention two elements are introduced and so used as to altogether change and modify the structure and its mode of use and at the same time render all the parts capable of removal from the site of use and for transportation as an assembled entirety, features which in bicycle practice are of great value.

It will be seen from Fig. 2 that the coupling-tube A is fitted at its outer end with a flange or button E, the upper surface of which serves as the under seat for the packing K. This flange fits the interior of the nipple-chamber closely and is tapered, as shown, to facilitate its ready passage into the chamber. The packing-ring K is an annulus of expansible material, like rubber, which is slipped over the tube A and is movable thereon. The expansion-ring J is also movable on the tube A and is of the form shown in cross-section in Fig. 1. Its under side has an annular beveled rib designed to force the substance of the packing to the sides of the chamber. The end of the gland is reduced to an edge, so as to furnish as little contact-surface to the upper side of the ring J as possible, the object being to leave the amount of frictional contact between the ring and the packing greater than that between the gland and the ring to the end that in the process of screwing the gland into the nipple the ring shall not slip or turn on the packing, but the slip shall be between the gland and the ring.

The coupling is made and used as follows: The end of the coupling-pipe is inserted in the nipple and the gland started to screw it down to its seat. The screwing in of the gland forces pipe, packing, and follower along collectively until the end of the pipe bottoms on the diaphragm of the nipple. Further screwing of the gland depresses the ring, causing its under V-shaped beveled edge to seat itself in the upper surface of the packing-ring K, causing it to be compressed and its substance to be crowded sidewise against the body of the pipe A and the inside wall of the chamber P. This compression of the ring K effects perfect closure of all channels for the escape or leakage of air or other fluid between tube H and the receiving-chamber, whatever it may be. Simply turning out the gland effects detachment of the apparatus, which may be collectively removed and taken care of.

It will be observed that in this invention the jaws between which the packing is compressed are both connected with the male member of the coupling and that neither the packing-ring nor the expanding-ring can be lost, as the flanged end of the pipe A confines them in their proper relations for use.

If necessary for any purpose to supply a new packing or expanding ring, the two parts of the coupling-pipe A may be separated at the joint D, which is fitted for that purpose, when the rings may be slipped off at that end.

I therefore claim as my invention—

The combination with a socketed and threaded valve-chamber of a coupling-pipe having its entering end fitted with a flanged packing-seat, a compressible packing-ring, an expanding-ring and a screw-threaded gland arranged loosely on said pipe above said flange in the order named, and provided in use with means for preventing the detachment of said movable parts from the pipe, and means for effecting tight connection with a supply-tube.

In witness whereof I have hereto subscribed my name, at North Bennington, Vermont, this 23d day of June, A. D. 1900, in the presence of two witnesses.

EDWARD T. SHAW.

Witnesses:
FRANKLIN SCOTT,
HENRY SHANAHAN.